United States Patent Office 3,769,303
Patented Oct. 30, 1973

3,769,303
CYCLIC ACETALS OF 2,4-HEXADIENAL
William M. Easter, Jr., Hasbrouck Heights, and Robert F. Tavares, Cedar Grove, N.J., assignors to Givaudan Corporation, Clifton, N.J.
No Drawing. Filed July 7, 1971, Ser. No. 160,554
Int. Cl. C07d 17/00
U.S. Cl. 260—338                  1 Claim

ABSTRACT OF THE DISCLOSURE

There are provided novel odorant compositions derived from the condensation of 2,4-hexadienal with certain diols. These novel acetals have a generally fruity citrus type odor.

FIELD OF THE INVENTION

Odorant acetals.

DESCRIPTION OF THE PRIOR ART

It is known in the art to condense aldehydes or ketones with diols to produce the corresponding cyclic acetal or ketal. However, it has not been known heretofore, that the condensation of 2,4-hexadienal with dihydroxy alkanes or dihydroxy alkenes would give rise to a system having desirable odorant qualities.

SUMMARY OF THE INVENTION

The compounds of the present invention have the following general formulae:

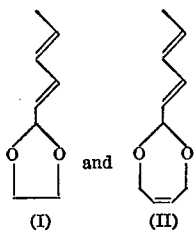

(I)        (II)

In accordance with the process of the present invention 2,4-hexadienal is reacted with the appropriate diol in the presence of an acid. The reaction may be illustrated as follows:

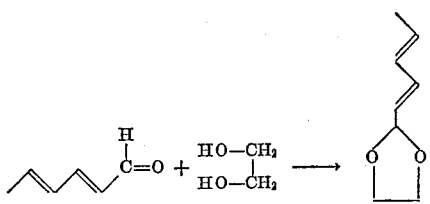

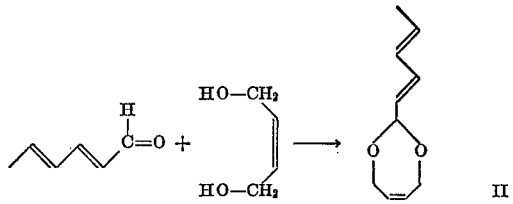

The compounds of the present invention are useful odorants having a fruity or fluoral citrus type of odor.

DESCRIPTION OF THE PREFERRED EMBODIMENTS

In the process of the present invention 2,4-hexadienal is taken up in an appropriate solvent, suitably reaction inert solvent capable of forming an azeotrope with water, and is heated with the appropriate diol in the presence of an acid catalyst.

Since the removal of water formed during the reaction is beneficial to drive the reaction to completion, common hydrocarbon azeotroping solvents such as cyclohexane, benzene, toluene, xylene, and the like are preferred. These listed solvents are purely illustrative and are not critical to the invention since the reaction can be run in any reaction inert solvent or in the absence of solvent.

The catalyst ecessary to provide an acidic medium may be an organic or inorganic acid. Thus, there may be used citric acid, tartaric acid, phosphoric acid, p-toluene sulfonic acid and the like. These listed catalysts are purely illustrative and not critical to the invention.

The relative amounts of reactants and catalyst in the reaction are not critical. We have found a small excess of the diol, suitably from about 10 to 50 mole percent relative to the hexadienal, and an amount of catalyst of about ½ to 1% by weight based on hexadienol to be appropriate. Such amounts of reactants and catalyst are merely illustrative and are not critical to the invention.

In the preferred procedure the mixture is heated under reflux with vigorous agitation until no further water is produced by the reaction mixture. It is particularly appropriate to carry out the reaction with a Dean-Stark trap. The reaction mixture is cooled, washed to neutrality with water and a mild base such as, suitably, saturated aqueous sodium bicarbonate or the like, the solvent removed by distillation, and the residue distilled under reduced pressure. The above process is provided as an illustration of the preferred procedure but is in no way to be considered as critical to the invention. Any reaction conditions known in the art to produce cyclic acetals from aldehydes and diols would be applicable to this invention.

In accordance with the process of the present invention closely related compounds were prepared utilizing other dihydroxy alkanes as reagents with 2,4-hexadienal. In these related compounds listed in Table I $R_1$, $R_2$, $R_3$, $R_4$ and $R_5$ are alkyl groups or hydrogen atoms.

TABLE I

| | R₁ | R₂ | R₁ | R₂ | R₃ | R₄ | R₅ | R₁ | R₂ | R₁ | R₂ | Dihydroxy alkane |
|---|---|---|---|---|---|---|---|---|---|---|---|---|
| 1 | H | H | | | | | | | | | | 1,2-dihydroxyethane. |
| 2 | H | CH₃ | | | | | | | | | | 1,2-dihydroxypropane. |
| 3 | CH₃ | CH₃ | | | | | | | | | | 2,3-dihydroxybutane. |
| 4 | | | H | H | H | H | H | | | | | 1,3-dihydroxypropane. |
| 5 | | | H | CH₃ | H | H | H | | | | | 1,3-dihydroxybutane. |
| 6 | | | CH₃ | CH₃ | H | H | H | | | | | 2,4-dihydroxypentane. |
| 7 | | | CH₃ | CH₃ | H | H | CH₃ | | | | | 2,4-dihydroxy-2-methylpentane. |
| 8 | | | H | CH(CH₃)CH₃ | CH₃ | CH₃ | H | | | | | 1,3-dihydroxy-2,2,4-trimethylpentane. |
| 9 | | | H | CH₃ | CH₃ | CH₃ | H | | | | | 1,3-dihydroxy-2,2-dimethylbutane. |
| 10 | | | H | H | CH₃ | CH₃ | H | | | | | 1,3-dihydroxy-2,2-dimethylpropane. |
| 11 | | | | | | | | H | H | | | 1,4-butan diol-2-buten -1,4-diol. |
| 12 | | | | | | | | | | H | H | |

It is the interesting and surprising finding of this invention that of all the compounds prepared only two possess any utility as odorants namely, 2-(1,3 - pentadien-1-yl)-1,3-dioxolane (No. 1 in Table I) and 2-(1,3-pentadien-1-yl-1,7 - dihydro-1,3-dioxepin (No. 12 in Table I). The remaining compounds either have no odorant effect or have no adverse effect upon odorant compositions to which they are added.

2-(1,3-pentadien-1-yl)-1,3-dioxolane, prepared by condensing ethylene glycol with 2,4-hexadienal has a sweet, green, jasmine like odor, having a top-note of orange peel which makes it particularly useful in perfume compositions such as citrus, bergamot, and floral odors. 2-(1,3-pentadien-1-yl)-4,7-dihydro - 1,3 - dioxepin has a fruity citrus note coupled with a green bergamot pineapple odor, having a sour lime touch. It is useful in perfume compositions of the bergamot, lime and general citrus type.

These compounds may be used in ratios of from about 10 to about 200 parts per thousand of odorant base compositions containing them.

The compounds may be used to prepare odorant compositions which may be used as odorant bases for the preparation of perfumes and toilet waters by adding the usual alcoholic and aqueous diluents thereto, approximately 15–20% of base would be used for the former and approximately 3–5% would be used for the latter.

Similarly, the base compositions may be used to odorize soaps, detergents, cosmetics, or the like. In these instances a base concentration of from about 0.5 to about 2% may be used. All the above concentration ratios are by weight.

EXAMPLE I

Preparation of 2-(1,3-pentadien-1-yl)-4,7-dihydro-1,3-dioxepin

Into a one liter flask equipped with heating jacket, agitator and a condenser fitted with a Dean-Stark trap was charged 96 gms. 2,4-hexadienal, 97 gms. of 2-butene-1,4-diol, 1 gm. of citric acid and 160 gms. cyclohexane. With vigorous agitation the mixture was refluxed until the collection of water in the Dean-Stark trap was completed. The reaction mixture was cooled and washed neutral. The solvent was removed and the oil vacuum distilled. There was recovered 147 gms. of 2-(1,3-pentadien-1-yl)-4,7-dihydro-1,3-dioxepin having the following physical properties:

B.P. _____ ° C./9 mm__ 107
$n_D^{20}$ _____ 1.5150
Carbonyl _____percent by IR__ 0.0
V. pc. _____percent__ 98.7
Colorless.

EXAMPLE II

Preparation of 2-(1,3-pentadien-1-yl)-1,3-dioxolane

Into a one liter flask equipped with heating jacket, agitator and a condenser fitted with a Dean-Stark trap was charged 96 gms. 2,4-hexadienal, 93 gms. of ethylene glycol, 1 gm. citric acid and 175 gms. toluene. With agitation the mixture was refluxed until collection of water-ethylene glycol mixture was completed. After 7 hours there was collected 50.5 gm. of a water-ethyleneglycol mixture. The reaction mixture was cooled and washed neutral. The solvent was removed and the oil vacuum distilled. There was recovered 111 gms. of 2-(1,3-pentadien-1-yl)-1,3-dioxolane having the following physical properties:

B.P. _____ ° C./8.5 mm__ 82
$n_D^{20}$ _____ 1.4975
Carbonyl _____percent by IR__ 0.0
Colorless.

EXAMPLE III

The following citrus type odorant base formulation was used to demonstrate the use of 2-(1,3-pentadien-1-yl)-4,7-dihydro-1,3-dioxepin. All of the parts in the example are by weight.

| | |
|---|---|
| Linalool synthetic | 8 |
| Citral synthetic | 12 |
| Geranyl acetate extra | 20 |
| Linalool acetate | 300 |
| Orange oil, C.P. | 100 |
| Petigran, S.A. | 20 |
| Triethyl citrate | 125 |
| Terpinyl acetate extra | 155 |
| Lemon terpenes | 160 |
| 2-(1,3-pentadien-1-yl)-4,7-dihydro-1,3-dioxepin | 100 |
| | 1000 |

The dioxepin imparted a neutral citrus quality and contributed to the bouquet of the perfume base. Without the dioxepin the base seemed unfinished and of inferior quality.

EXAMPLE IV

If the formula of Example III is modified by replacing the 2-(1,3-pentadien-1-yl)-4,7-dihydro-1,3-dioxepin with 2-(1,3-pentadien-1-yl)-1,3-dioxolane, the dioxolane imparts a natural citrus quality which is a definite improvement over the perfume without the dioxolane.

EXAMPLE V

If the formulae of Example III is modified by replacing the 2 - (1,3-pentadien-1-yl)-4,7-dihydro-1,3-dioxepin with any of the other cyclic acetals of 2,4-hexadienal shown in Table I, excepting the 2-(1,3-pentadien-1-yl)-1,3-dioxolane, the citrus formula is not improved by the presence of the cyclic acetal and in some cases a detrimental effect is observed.

We claim:
1. 2-(1,3-pentadien-1-yl)-4,7-dihydro-1,3-dioxepin.

References Cited

UNITED STATES PATENTS

| | | | |
|---|---|---|---|
| 3,268,559 | 8/1966 | Pawloski et al. | 260—338 |
| 3,381,039 | 4/1968 | Marbet | 260—338 X |

ALEX MAZEL, Primary Examiner

J. H. TURNIPSEED, Assistant Examiner

U.S. Cl. X.R.

99—140 R; 260—340.7, 340.9; 252—522; 424—76

UNITED STATES PATENT OFFICE
CERTIFICATE OF CORRECTION

Patent No. 3,769,303                    Dated October 30, 1973

Inventor(s) William M. Easter, Jr.

It is certified that error appears in the above-identified patent and that said Letters Patent are hereby corrected as shown below:

1. Column 2; line 32: "necessary, "n" omitted; line 41, hexadienol, should be hexadienal.

2. Table (columns 3 and 4); correct line 11 and 12 of table line 11; should read 1,4-butandiol, line 12; should read 2-buten-1,4-diol.

3. Column 3; line 33 and 34; the compound name is 2-(1,3-pentadien-1-yl)-4,7-dihydro-1,3-dioxepin.

4. Column 4; VPC rather than V.pc. on line 33.

Signed and sealed this 8th day of April 1975.

(SEAL)
Attest:

RUTH C. MASON
Attesting Officer

C. MARSHALL DANN
Commissioner of Patents
and Trademarks